(12) United States Patent
Takeuchi et al.

(10) Patent No.: US 8,111,503 B2
(45) Date of Patent: Feb. 7, 2012

(54) GAS-INSULATED SWITCHGEAR

(75) Inventors: Hiroshi Takeuchi, Tokyo (JP);
Masanori Osumi, Tokyo (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 217 days.

(21) Appl. No.: 12/600,535

(22) PCT Filed: Jul. 17, 2007

(86) PCT No.: PCT/JP2007/064113
§ 371 (c)(1),
(2), (4) Date: Nov. 17, 2009

(87) PCT Pub. No.: WO2009/011039
PCT Pub. Date: Jan. 22, 2009

(65) Prior Publication Data
US 2010/0149730 A1   Jun. 17, 2010

(51) Int. Cl.
*H02B 7/01* (2006.01)
*H02B 5/06* (2006.01)
(52) U.S. Cl. ......... 361/618; 361/604; 361/612; 361/619
(58) Field of Classification Search .......... 361/604, 361/612, 618, 619
See application file for complete search history.

(56) References Cited

U.S. PATENT DOCUMENTS

| | | | | |
|---|---|---|---|---|
| 5,373,415 | A * | 12/1994 | Tawaratani | 361/612 |
| 6,646,861 | B1 * | 11/2003 | Watanabe et al. | 361/612 |
| 6,664,493 | B2 * | 12/2003 | Yamada et al. | 218/43 |

FOREIGN PATENT DOCUMENTS

| | | |
|---|---|---|
| JP | 59-47908 A | 3/1984 |
| JP | 59-59002 A | 4/1984 |
| JP | 59-106808 A | 6/1984 |
| JP | 61-92106 A | 5/1986 |
| JP | 61-161909 A | 7/1986 |
| JP | 11-355923 A | 12/1999 |
| JP | 2002-186124 A | 6/2002 |
| JP | 2003-189430 A | 7/2003 |
| JP | 2008-29079 A | 2/2008 |

OTHER PUBLICATIONS

International Search Report for PCT/JP2007/064113 completed Oct. 15, 2007.
Written Opinion for PCT/JP2007/064113 completed Oct. 15, 2007.
Official Action issued on Nov. 4, 2011 by the Japanese Patent Office in corresponding Japanese Patent Application No. 2009-523477, and English language translation of the Official Action.

* cited by examiner

*Primary Examiner* — Zachary M Pape
(74) *Attorney, Agent, or Firm* — Buchanan Ingersoll & Rooney PC

(57) ABSTRACT

A gas-insulated switchgear allowing reduction in layout dimension in a direction of axis lines of circuit breakers and also reduction in layout dimension in a direction orthogonal to the direction of the axis lines of the circuit breakers, thereby allowing reduction in installation area. Between two main buses disposed in parallel, first, second and third circuit breakers are disposed as being aligned so that each axis line is orthogonal to a direction of axis lines of the main buses. A branch line drawn from a portion between the first and second circuit breakers and a branch line drawn from a portion between the second and third circuit breakers are connected to respective cable heads. The centers of the cable heads are configured so as to be positioned on a straight line orthogonal to the direction of the axis lines of the main buses.

5 Claims, 4 Drawing Sheets

GAS-INSULATED SWITCHGEAR

TECHNICAL FIELD

The present invention relates to a gas-insulated switchgear and, in particular, to a gas-insulated switchgear of a 1½ CB scheme configured with three circuit breakers connected in series between a pair of main buses.

BACKGROUND ART

As a circuit scheme for a gas-insulated switchgear, a bus scheme with a so-called 1½ CB (Circuit Breaker) structure may be adopted when high reliability is required at a large-capacity electric power substation or the like. The gas-insulated switchgear of this bus scheme has three circuit breakers forming a unit structure connected in series and disposed between main buses in a pair. That is, in this scheme, for the purpose of leading two circuits, three circuit breakers are used, thereby preventing the system from being affected even in the case of a bus trouble. Also, consideration is given such that checking the circuit breakers and others does not involve a suspension of lines.

As a conventional technology adopting a bus scheme of this 1½ CB structure, for example, there is a gas-insulated switchgear disclosed in a first patent document. In the first patent document, first, second, and third circuit breakers each having disconnect switches attached on both sides are electrically connected in series, and the first and third circuit breakers each have its one end connected to a main bus. Also, branch buses are drawn from a portion between the first circuit breaker and the second circuit breaker and a portion between the second circuit breaker and the third circuit breaker. Furthermore, a two-directional branch is provided to either one of the disconnect switches attached to the first, second, and third circuit breakers and facing each other, and its branching portion has a branch bus connected thereto.

First patent document: Japanese Patent Application Laid-open No. 2002-186124 (p. 2, FIG. 1)

DISCLOSURE OF INVENTION

Disclosure of the Invention

However, the conventional technology explained above has the following problem. That is, the conventional gas-insulated switchgear with the 1½ CB structure disclosed in the first patent document has three circuit breakers connected in series and disposed between the main buses in a pair on the same straight line parallel to a direction of axis lines of the main buses. Therefore, the dimension of the circuit breakers in the direction of their axis lines is large, and a large installation area is required for the gas-insulated switchgear as a whole. At an electric power substation or the like where the gas-insulated switchgear is placed, the demand for reduction of the installation area is large for outdoor placement due to the difficulty in obtaining a building site or the like. For indoor placement, due to restrictions in the inside space of the building, how the apparatus is placed within a limited space with increased accommodation efficiency is a large problem.

The present invention has been devised in view of the above, and an object thereof is to provide a gas-insulated switchgear allowing reduction in layout dimension in a direction of axis lines of circuit breakers and also reduction in layout dimension in a direction orthogonal to the direction of the axis lines of the circuit breakers, thereby allowing reduction in installation area.

SUMMARY OF THE INVENTION

In order to solve the above mentioned problems and to achieve the object, a gas-insulated switchgear according to the present invention includes first and second main buses disposed in parallel; first, second, and third horizontal-type circuit breakers that are disposed as being aligned in a direction of axis lines of both the main buses so as to each have an axis line mutually orthogonal to the direction of the axis lines of both the main buses, the circuit breakers electrically connecting both the main buses together in series and also each having a pair of disconnect switches attached at both sides; first and second branch lines, the first branch line being drawn from a portion between the first circuit breaker and the second circuit breaker, and the second branch line being drawn from a portion between the second circuit breaker and the third circuit breaker; and first and second cable heads connected to the first and second branch lines, respectively, wherein the first and second cable heads are disposed so that a center of the first cable head and a center of the second cable head are positioned on a straight line orthogonal to the direction of the axis lines of both the main buses in a planar view.

EFFECTS OF THE INVENTION

In the present invention, three circuit breakers are disposed so that their axis lines are oriented toward a direction orthogonal to a direction of axis lines of both the main buses and are aligned in the direction of the axis lines of both the main buses, and also two cable heads are disposed so that a straight line connecting the respective centers of two cable heads together in a planar view is orthogonal to the direction of the axis lines of both the main buses. With this, the dimension of a portion between two main buses having the circuit breakers disposed therein, that is, the layout dimension in a direction of axis lines of the circuit breakers, can be reduced, and also the dimension in a direction orthogonal to a direction of axis lines of the circuit breakers can be reduced, thereby allowing obtainment of a gas-insulated switchgear capable of reducing an installation area of the entire device. Therefore, in the layout environment for which restrictions in dimension is required, applicability within a limited installation range is improved.

DESCRIPTION OF REFERENCE NUMERALS

Figure 1:
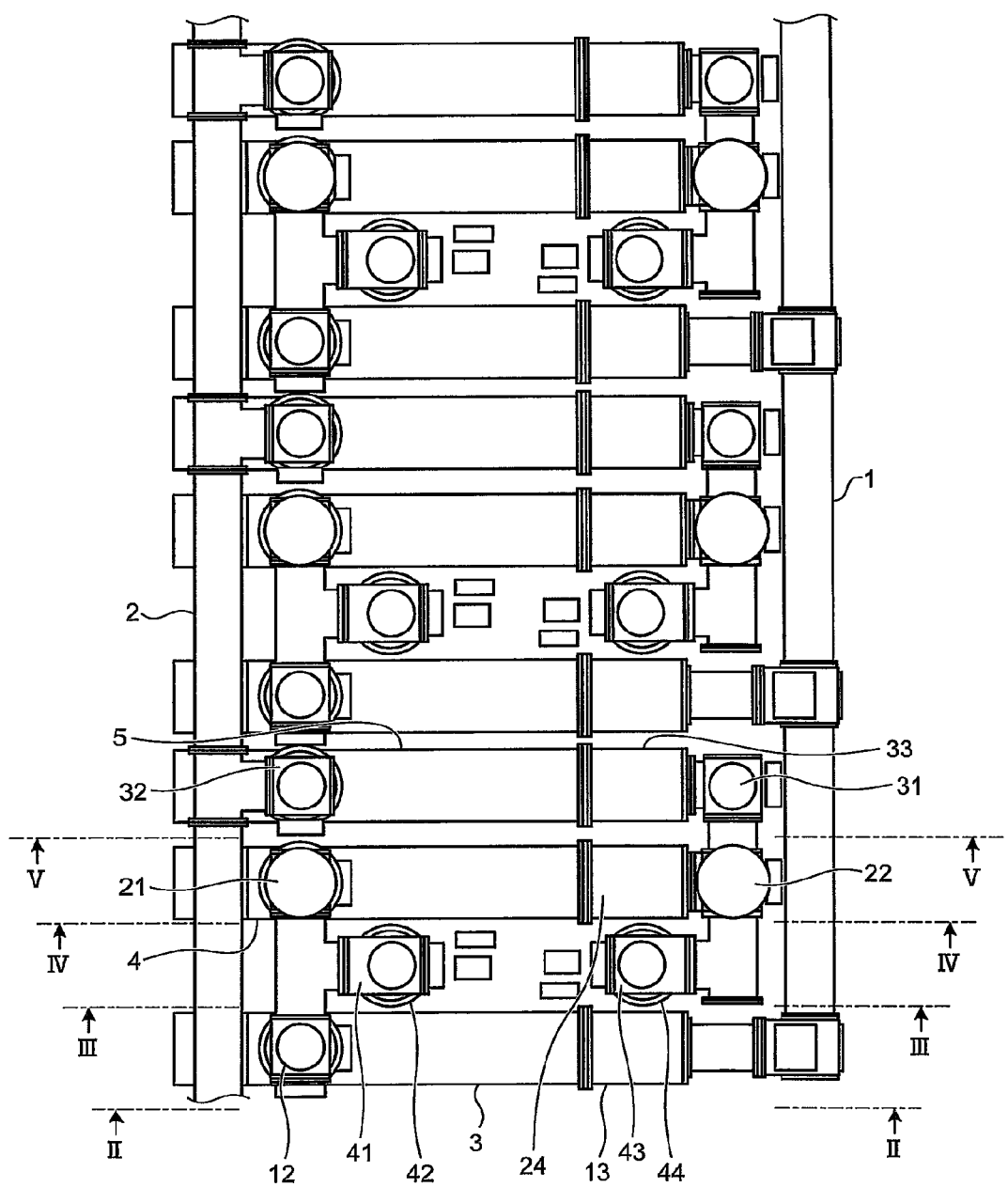
FIG. 1 is a plan view illustrating the structure of a gas-insulated switchgear according to an embodiment of the present invention.

1, 2 main bus
3, 4, 5 circuit breaker
11, 12, 21, 22, 31, 32 disconnect switch
13, 14, 23, 24, 33, 34 current transformer 15, 25, 26 short bus
41, 43 branch-line disconnect switch
42, 44 cable head
51, 52 branch line

BEST MODE FOR CARRYING OUT THE INVENTION

An embodiment of the gas-insulated switchgear according to the present invention is explained in detail below based on the drawings. Note that this embodiment is not meant to restrict the present invention.

Figure 2:
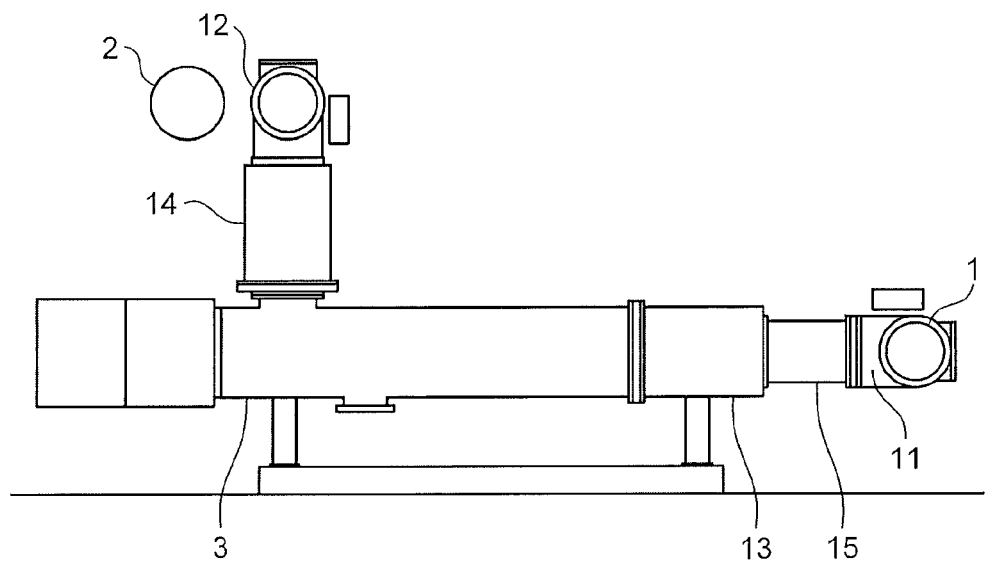
FIG. 2 is a side view (II-II arrow view) when the embodiment is viewed in an arrowed II-II direction in FIG. 1.
Figure 3:
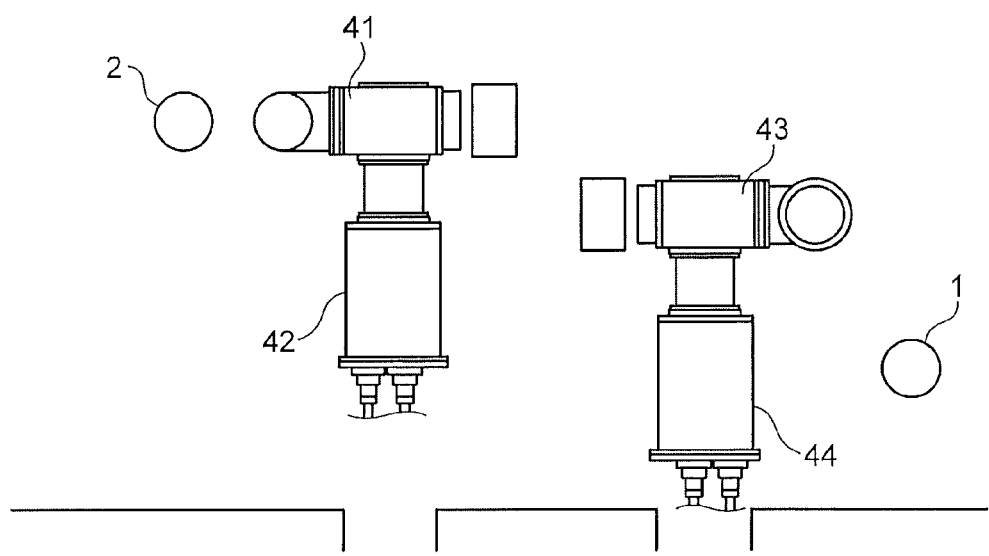
FIG. 3 is a side view (III-III arrow view) when the embodiment is viewed in an arrowed direction in FIG. 1.
Figure 4:
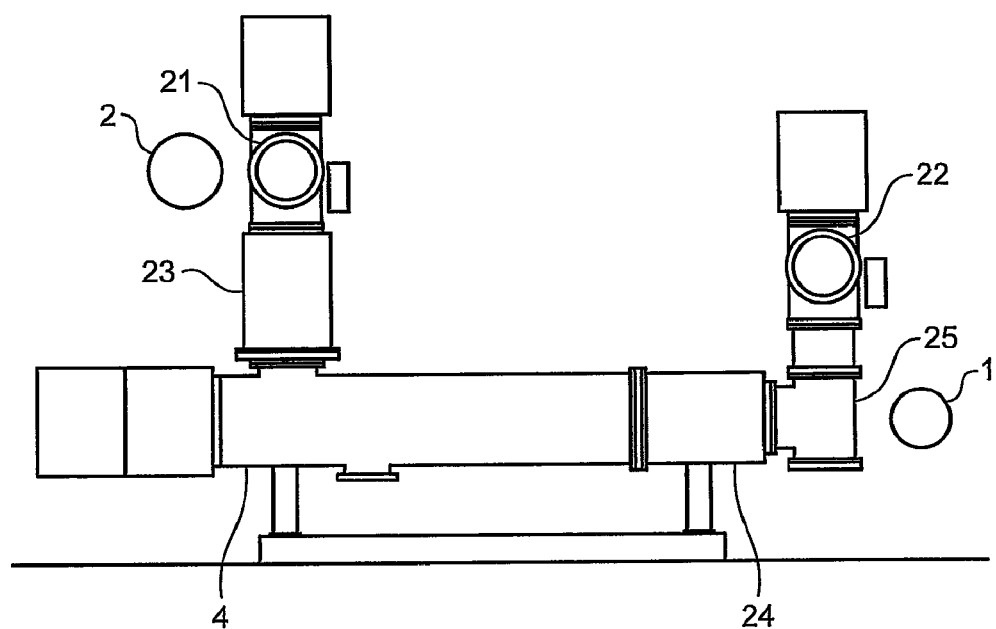
FIG. 4 is a side view (IV-IV arrow view) when the embodiment is viewed in an arrowed IV-IV direction in FIG. 1.
Figure 5:
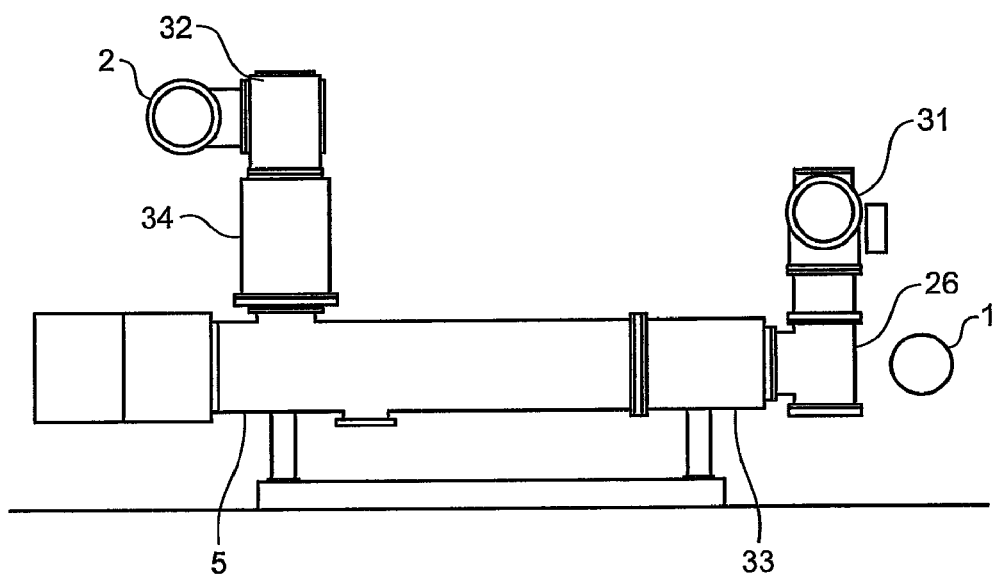
FIG. 5 is a side view (V-V arrow view) when the embodiment is viewed in an arrowed V-V direction in FIG. 1.
Figure 6:
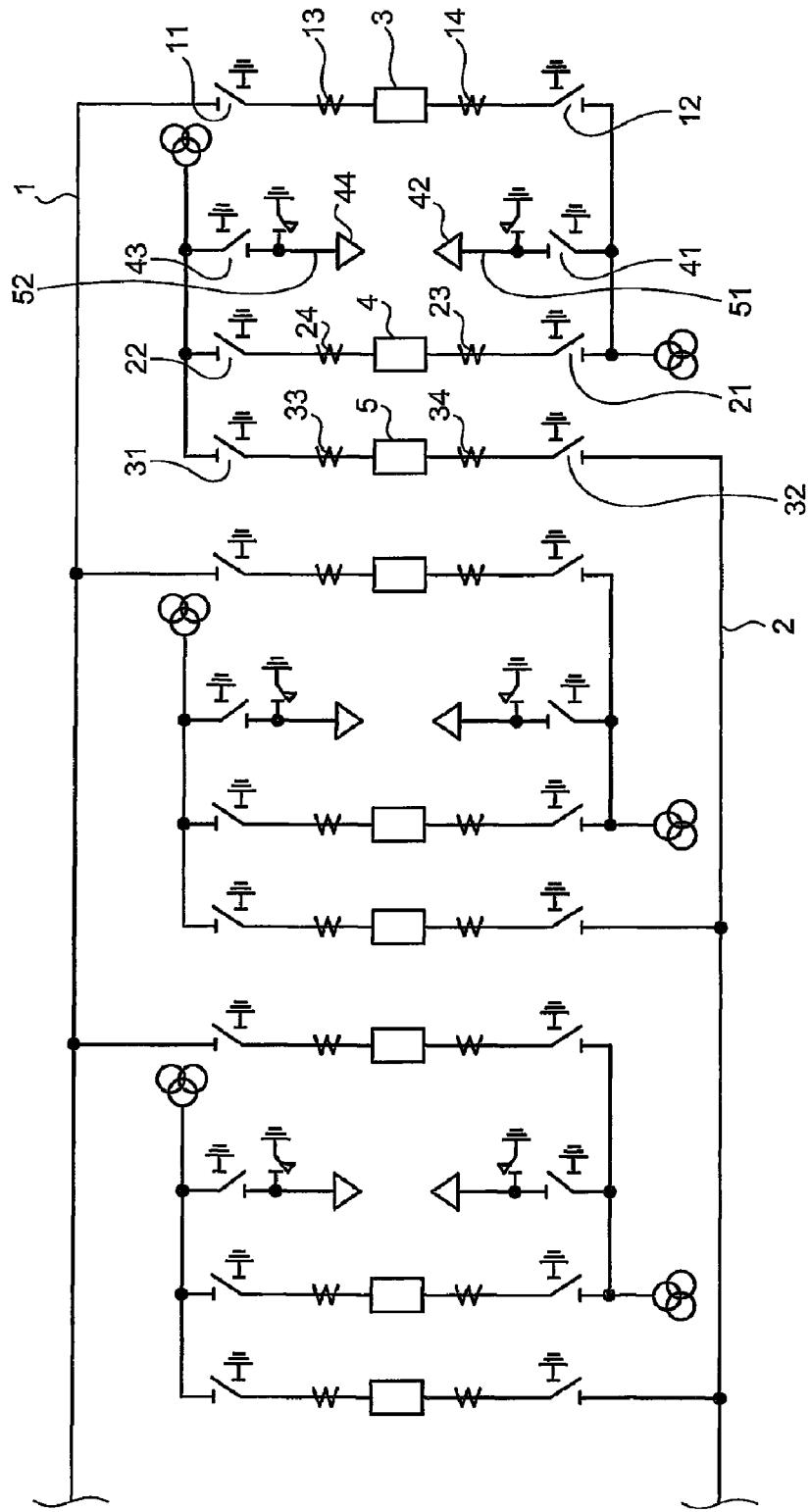
FIG. 6 is a single-line connection diagram of the gas-insulated switchgear according to the embodiment of the present invention.

FIG. 1 is a plan view illustrating the structure of a gas-insulated switchgear according to an embodiment of the present invention. FIG. 2 is a side view (II-II arrow view) when the embodiment is viewed in an arrowed II-II direction in FIG. 1. FIG. 3 is a side view arrow view) when the embodiment is viewed in an arrowed III-III direction in FIG. 1. FIG. 4 is a side view (IV-IV arrow view) when the embodiment is viewed in an arrowed IV-IV direction in FIG. 1. FIG. 5 is a side view (V-V arrow view) when the embodiment is viewed in an arrowed V-V direction in FIG. 1. FIG. 6 is a single-line connection diagram of the gas-insulated switchgear according to the embodiment of the present invention.

First, with reference to FIG. 6, the entire apparatus structure is explained. As depicted in the single-line connection diagram of FIG. 6, between a main bus 1 (first main bus) and a main bus 2 (second main bus), a circuit breaker 3 (first circuit breaker), a circuit breaker 4 (second circuit breaker), and a circuit breaker 5 (third circuit breaker) are electrically connected in series. On both sides of the circuit breaker 3, a disconnect switch 11 and a disconnect switch 12 are connected. A current transformer 13 is provided between the circuit breaker 3 and the disconnect switch 11, and a current transformer 14 is provided between the circuit breaker 3 and the disconnect switch 12. Similarly, on both sides of the circuit breaker 4, a disconnect switch 21 and a disconnect switch 22 are connected. A current transformer 23 is provided between the circuit breaker 4 and the disconnect switch 21, and a current transformer 24 is provided between the circuit breaker 4 and the disconnect switch 22. Similarly, on both sides of the circuit breaker 5, a disconnect switch 31 and a disconnect switch 32 are connected. A current transformer 33 is provided between the circuit breaker 5 and the disconnect switch 31, and a current transformer 34 is provided between the circuit breaker 5 and the disconnect switch 32. And, to lead a main circuit to a power transmission line, a potential transformer, or the like provided outside, a branch line 51 is led from a connection line connecting between the disconnect switch 12 and the disconnect switch 21. This branch line 51 is connected to a cable head 42 via a branch-line disconnect switch 41, and is further drawn by a cable (not shown) connected to this cable head 42. Similarly, a branch line 52 is led from a connection line connecting between the disconnect switch 22 and the disconnect switch 31. This branch line 52 is connected to a cable head 44 via a branch-line disconnect switch 43, and is further drawn by a cable (not shown) connected to this cable head 44. Such a structure is of a bus scheme referred to as so-called 1½ CB (Circuit Breaker). Note in FIG. 6 that three circuits of the structure of such a 1½ CB scheme are depicted.

In the present embodiment, leading of the branch lines 51 and 52 explained above are assumed to be leading by cables for explanation. However, this is not meant to be restrictive. For example, leading by air bushings may suffice. In the case of air bushings, the portions of the cable heads 42 and 44 are replaced with air bushings.

Also, in the depicted example, the case is depicted in which each disconnect switch is provided with an earth switch. However, this is not meant to be restrictive, and a disconnect switch without an earth switch may suffice. In the following, the disconnect switch is simply explained irrespectively of whether an earth switch is provided.

Next, the layout structure of the apparatus in the present invention is explained with reference to FIG. 1 to FIG. 5. FIG. 1 is a plan view, showing the view with the direction of the connection diagram of FIG. 6 being changed by 90 degrees. Note in the following that one circuit with reference numerals in the drawing is explained. As depicted in FIG. 1, between the main bus 1 and the main bus 2 disposed in parallel, three horizontal-type circuit breakers, that is, the circuit breaker 3, the circuit breaker 4, and the circuit breaker 5, are provided as being disposed with their longitudinal directions horizontal to the installation plane. The circuit breakers 3 to 5 have their respective axis lines oriented toward a direction orthogonal to a direction of axis lines of the main buses 1 and 2, and are disposed as being aligned in the direction of the axis lines of the main buses 1 and 2. The main bus 1 and the main bus 2 are of a three-phase type, for example. And, three circuit breakers 3 to 5 are electrically connected in series, with one end side of the circuit breaker 3 connected to the main bus 1 and one end side of the circuit breaker 5 connected to the main bus 2. Furthermore, two cable heads 42 and 44 are disposed on the same straight line orthogonal to the direction of the axis lines of the main buses 1 and 2. That is, the structure is such that the cable heads 42 and 44 are disposed so that the center of the cable head 42 and the center of the cable head 44 are positioned on the same straight line orthogonal to the direction of the axis lines of the main buses 1 and 2.

The circuit breaker 3 and the circuit breaker 4 are connected together with a horizontal electric circuit (not shown), and this horizontal electric circuit connecting the circuit breaker 3 and the circuit breaker 4 together has disposed therein a branch-line disconnect switch 41. Similarly, the circuit breaker 4 and the circuit breaker 5 are connected together with a horizontal electric circuit (not shown), and this horizontal electric circuit connecting the circuit breaker 4 and the circuit breaker 5 together has disposed therein a branch-line disconnect switch 43. Note that since the layout positions of the branch-line disconnect switches 41 and 43 are both between the circuit breakers 3 and 4, the route shapes of the respective horizontal electric circuits are different from each other accordingly. In particular, the horizontal electric circuit connecting the circuit breaker 4 and the circuit breaker 5 is connected to the branch-line disconnect switch 43 after being led to a circuit breaker 3 side. From the horizontal electric circuit connecting the circuit breaker 3 and the circuit breaker 4 together via the branch-line disconnect switch 41 and the cable head 42 disposed in this horizontal electric circuit, a branch line 51 is drawn by a cable. Similarly, from the horizontal electric circuit connecting the circuit breaker 4 and the circuit breaker 5 together via the branch-line disconnect switch 43 and the cable head 44 disposed in this horizontal electric circuit, the branch line 52 is drawn by a cable. Note in the present embodiment that devices, such as the circuit breakers and the disconnect switches depicted in FIG. 1, are all three-phase devices.

Next, with reference to the side views of the respective portions corresponding to the plane layout in FIG. 1, explanation is made for each portion in further detail.

FIG. 2 is a II-II arrow view of FIG. 1 and a side view at the installation point of the circuit breaker 3. As depicted in FIG. 2, the main buses 1 and 2 are disposed in parallel but, as for a height direction, the main bus 2 is disposed higher than the main bus 1. The main bus 1 has connected thereto the disconnect switch 11. To this disconnect switch 11, a short bus 15 extending in a direction orthogonal to the direction of the axis line of the main bus 1 and also in a horizontal direction is connected. On the axis line of this short bus 15, the circuit breaker 3 directly connecting the current transformer 13 is disposed. On the other end side of the circuit breaker 3, the current transformer 14 is mounted so as to be oriented vertically upward, and the disconnect switch 12 is placed further above.

Next, with the III-III arrow view of FIG. 3, the structure of an intermediate portion between the circuit breaker 3 and the circuit breaker 4 is explained. As explained above, the disconnect switch 12 on a circuit breaker 3 side and the disconnect switch 21 on a circuit breaker 4 side are connected together via a horizontal electric circuit, and the branch-line disconnect switch 41 is disposed on this horizontal electric circuit. In practice, a conductor forming the horizontal electric circuit is incorporated in the branch-line disconnect switch 41 together with a disconnect-portion contact of the branch-line disconnect switch 41, and therefore is not shown. When viewed from outside, three disconnect switches 12, 41, and 21 are connected as being aligned (refer to FIG. 1). This structure is adopted so as to connect the circuit breakers 3 and 4 together at a distance as shortest as possible. If there is a dimensional allowance for layout in the direction of the axis lines of the main buses 1 and 2, the horizontal electric circuit may be configured with a short bus connecting the disconnect switch 12 and the disconnect switch 21, and the branch-line disconnect switch 41 may be provided at some point in the short bus.

The branch-line disconnect switch 41 has connected thereto the cable head 42, and a cable (not shown) is led toward the installation plane vertically downward as a branch line. The cable head 42 is disposed on a side opposite to the main bus 2, which is an adjacent main bus, that is, on a main bus 1 side in this case, with respect to the horizontal electric circuit. Note that the structure is possible in which the cable head 42 is disposed on the main bus 2 side with respect to the horizontal electric circuit.

Similarly, the branch-line disconnect switch 43 has connected thereto the cable head 44, and a cable (not shown) is led toward the installation plane vertically downward as a branch line. As with the above, the horizontal electric circuit connecting the disconnect switch 22 and the disconnect switch 31 has a structure so as to make the shortest connection between the circuit breakers 3 and 4. Also, the cable head 44 is disposed on a side opposite to the main bus 1, which is an adjacent main bus, that is, on a main bus 2 side in this case, with respect to the horizontal electric circuit. Note that the structure is possible in which the cable head 44 is disposed on the main bus 1 side with respect to the horizontal electric circuit.

Next, with the IV-IV arrow view of FIG. 4, the structure of the installation point of the circuit breaker 4 is explained. Vertically below the disconnect switch 21 connected to the branch-line disconnect switch 41 explained above, the current transformer 23 is disposed and, further, its lower portion is connected to one end side of the circuit breaker 4. And, on the other end side of the circuit breaker 4 horizontally disposed, the current transformer 24 is provided and, further, the disconnect switch 22 is connected via a short bus 25 oriented vertically upward.

Next, with the IV-IV arrow view of FIG. 5, the structure of the installation point of the circuit breaker 5 is explained. Vertically below the disconnect switch 32 connected to the main bus 2, the current transformer 34 is disposed and, further, its lower portion is connected to one end side of the circuit breaker 5. And, on the other end side of the circuit breaker 5 horizontally disposed, the current transformer 33 is provided and, further, the disconnect switch 31 is connected via a short bus 26 oriented vertically upward.

In this manner, in the gas-insulated switchgear according to the present embodiment, between the main bus 1 and the main bus 2 disposed in parallel, the circuit breaker 3, the circuit breaker 4, and the circuit breaker 5 are electrically connected in series as being folded twice in a rectangular shape in a planar view so as to go and return between the main buses 1 and 2. In addition, the structure is such that two cable heads 42 and 44 led via the branch-line disconnect switches 41 and 43 from the horizontal electric circuits connecting the circuit breakers 3 and 4 and connecting the circuit breakers 4 and 5, respectively, are disposed on the same straight line orthogonal to the direction of the axis lines of both the main buses.

As explained above, according to the present embodiment, in the gas-insulated switchgear of the 1½ CB structure, three circuit breakers 3, 4, and 5 are disposed so that their axis lines are oriented toward a direction orthogonal to a direction of axis lines of the main buses 1 and 2 and are aligned in the direction of the axis lines of the main buses 1 and 2. Therefore, the dimension between two main buses 1 and 2 where the circuit breakers 3, 4, and 5 are disposed (that is, the layout dimension in the direction of the axis lines of the circuit breakers 3, 4, and 5) can be reduced. Accordingly, two cable heads 42 and 44 led from the horizontal electric circuits connecting the circuit breakers 3 and 4 and connecting the circuit breakers 4 and 5 via the branch-line disconnect switches 41 and 43, respectively, are disposed on the same straight line orthogonal to the direction of the axis lines of both the main buses 1 and 2. With this, the layout dimension in the direction orthogonal to the direction of the axis lines of the circuit breakers 3, 4, and 5 can be reduced. For this reason, a gas-insulated switchgear capable of reducing the installation area of the entire apparatus can be obtained. Therefore, for example, when the switchgear is used for an indoor electric power substation or the like, applicability within a limited installation range is improved, and thus a gas-insulated switchgear that is excellent also in economic efficiency can be provided.

In particular, the branch lines 51 and 52 are led by cables from the horizontal electric circuits connecting between the circuit breakers 3 and 4 and connecting between the circuit breakers 4 and 5 via the branch-line disconnect switches 41 and 43 and the cable heads 42 and 44, respectively, and the cable heads 42 and 44 are disposed on the same straight line orthogonal to the direction of the axis lines of both the main buses 1 and 2, respectively. With this, installation areas required for the cable heads can be integrated, and also the occupied dimension in the direction of the axis lines of the main buses 1 and 2 per circuit can be reduced.

INDUSTRIAL APPLICABILITY

As explained above, the gas-insulated switchgear according to the present invention is suitable for reduction in installation area at an electric power substation or the like.

The invention claimed is:
1. A gas-insulated switchgear comprising:
first and second main buses disposed in parallel;
first, second, and third horizontal-type circuit breakers that are disposed as being aligned in a direction of axis lines of both the main buses so as to each have an axis line mutually orthogonal to the direction of the axis lines of both the main buses, the circuit breakers electrically connecting both the main buses together in series and also each having a pair of disconnect switches attached at both sides;

first and second branch lines, the first branch line being drawn from a portion between the first circuit breaker and the second circuit breaker, and the second branch line being drawn from a portion between the second circuit breaker and the third circuit breaker; and first and second cable heads connected to the first and second branch lines, respectively, wherein the first and second cable heads are disposed so that a center of the first cable head and a center of the second cable head are positioned on a straight line orthogonal to the direction of the axis lines of both the main buses in a planar view.

2. The gas-insulated switchgear according to claim 1, wherein the first branch line is drawn by a cable from a first horizontal electric circuit that connects the first circuit breaker and the second circuit breaker together, via a disconnect switch for the first branch line and the first cable head, and the second branch line is drawn by a cable from a second horizontal electric circuit that connects the second circuit breaker and the third circuit breaker together, via a disconnect switch for the second branch line and the second cable head.

3. A gas-insulated switchgear comprising:

first and second main buses disposed in parallel;

first, second, and third horizontal-type circuit breakers that are disposed as being aligned in a direction of axis lines of both the main buses so as to each have an axis line mutually orthogonal to the direction of the axis lines of both the main buses, the circuit breakers electrically connecting both the main buses together in series and also each having a pair of disconnect switches attached at both sides;

first and second branch lines, the first branch line being drawn from a portion between the first circuit breaker and the second circuit breaker, and the second branch line being drawn from a portion between the second circuit breaker and the third circuit breaker; and first and second cable heads connected to the first and second branch lines, respectively, wherein the first and second cable heads are disposed between both the main buses in a planar view, and wherein the first and second cable heads are disposed so that a center of the first cable head and a center of the second cable head are positioned on a straight line orthogonal to the direction of the axis lines of both the main buses in a planar view.

4. The gas-insulated switchgear according to claim 3, wherein the first branch line is drawn by a cable from a first horizontal electric circuit that connects the first circuit breaker and the second circuit breaker together, via a disconnect switch for the first branch line and the first cable head, and the second branch line is drawn by a cable from a second horizontal electric circuit that connects the second circuit breaker and the third circuit breaker together, via a disconnect switch for the second branch line and the second cable head.

5. A gas-insulated switchgear comprising:

first and second main buses disposed in parallel;

first, second, and third horizontal-type circuit breakers that are disposed as being aligned in a direction of axis lines of both the main buses so as to each have an axis line mutually orthogonal to the direction of the axis lines of both the main buses, the circuit breakers electrically connecting both the main buses together in series and also each having a pair of disconnect switches attached at both sides;

first and second branch lines, the first branch line being drawn from a portion between the first circuit breaker and the second circuit breaker, and the second branch line being drawn from a portion between the second circuit breaker and the third circuit breaker; and first and second air bushings connected to the first and second branch lines, respectively, wherein the first and second air bushings are disposed between both the main buses in a planar view, and wherein the first and second air bushings are disposed so that a center of the first air bushing and a center of the second air bushing are positioned on a straight line orthogonal to the direction of the axis lines of both the main buses in a planar view.

* * * * *